(12) United States Patent
Thubert et al.

(10) Patent No.: US 8,072,910 B2
(45) Date of Patent: Dec. 6, 2011

(54) RETRANSMITTING LOST PACKET WITH SUBSEQUENT RECEIVED PACKET

(75) Inventors: Pascal Thubert, La Colle sur Loup (FR); Patrick Wetterwald, Mouans Sartoux (FR); Vincent Jean Ribiere, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 1049 days.

(21) Appl. No.: 11/984,471

(22) Filed: Nov. 19, 2007

(65) Prior Publication Data

US 2009/0129309 A1    May 21, 2009

(51) Int. Cl.
 *H04L 12/56*  (2006.01)
 *H04J 1/16*   (2006.01)

(52) U.S. Cl. ........ 370/278; 370/252; 370/282; 370/328; 714/749

(58) Field of Classification Search .................. 370/252, 370/278, 282, 328; 714/749
See application file for complete search history.

(56) References Cited

U.S. PATENT DOCUMENTS

| | | | | |
|---|---|---|---|---|
| 5,983,382 | A * | 11/1999 | Pauls ........................... | 714/744 |
| 6,996,100 | B1 * | 2/2006 | Haartsen ...................... | 370/389 |
| 2006/0056456 | A1 | 3/2006 | Ratiu et al. | |
| 2007/0206621 | A1 * | 9/2007 | Plamondon et al. .......... | 370/413 |

OTHER PUBLICATIONS

U.S. Appl. No. 11/657,662, filed Jan. 25, 2007, Thubert et al.
U.S. Appl. No. 11/729,886, filed Mar. 30, 2007, Thubert et al.
Calhoun et al., "CAPWAP Protocol Specification", Network Working Group, Internet Draft, <draft-ietf-capwap-protocol-specification-07>, Jun. 11, 2007, pp. 1-132.
Calhoun et al., "Light Weight Access Point Protocol", Control and Provisioning of Wireless Access Points Working Group, Internet Draft, <draft-ohara-capwap-lwapp-04.txt>, Mar. 2, 2007, pp. 1-137.
"IEEE Std 802.11e", Amendment to IEEE Std 802.11, 1999 Edition (Reaff 2003), Nov. 11, 2005, Pages: cover, i-xx, 18-26, 83-100 and 136-140 (63 total pages), IEEE Computer Society, New York.
"IEEE Wireless LAN Edition, compilation based on IEEE Std 802.11—1999 (R2003) and its amendments, pAGES: cover, Terms of Use, i-xxvi, 1-16, 25-27, 33-55, 83-110, 178-185, 286 and 344 (108 total pages), IEEE Press.

* cited by examiner

*Primary Examiner* — John Pezzlo
(74) *Attorney, Agent, or Firm* — Leon R. Turkevich

(57) ABSTRACT

In one embodiment, a method comprises transmitting onto a wireless connection, by a device, a first wireless data packet destined for a second device; in response to a determined absence by the device of a required acknowledgment of the first wireless data packet from the second device, queuing by the device the first wireless data packet while waiting for a second wireless data packet; receiving by the device the second wireless data packet; and transmitting, by the device, the first wireless data packet with the second wireless data packet to the second device via the wireless connection in response to the device receiving the second wireless data packet and before any other device can send a data frame on the wireless connection.

19 Claims, 3 Drawing Sheets

RETRANSMITTING LOST PACKET WITH SUBSEQUENT RECEIVED PACKET

TECHNICAL FIELD

The present disclosure generally relates to retransmitting data packets in wireless local area networks (WLANs) using wireless link protocols, for example IEEE 802.11 wireless Ethernet.

BACKGROUND

Wireless local area networks are being deployed in large-scale service areas using mesh networking. Mesh networking can utilize mesh access points (MAPs) that communicate with each other over one or more wireless hops (using, for example wireless IEEE 802.11 links). The distribution of the mesh access points extends wireless coverage of the WLAN over a larger coverage area for wireless user devices. Each wireless mesh access point (MAP) can provide connectivity for wireless host nodes based on forwarding received packets to a mesh access point having a wired connection (i.e., a "Roof-top Access Point" (RAP)): the Roof-top Access Point provides wired connectivity to a wired local area network.

Existing wireless link protocols (e.g., IEEE 802.11e) typically specify that if a wireless network node does not receive an expected acknowledgment frame within a prescribed interval following wireless transmission of a data frame, the wireless network node must retry transmission of the data frame after waiting a prescribed time interval: this prescribed time interval is determined in Sec. 9.9.1.5 of IEEE 802.11e using a "backoff procedure". The retried transmission following the backoff procedure can be repeated until a prescribed retry limit is reached.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
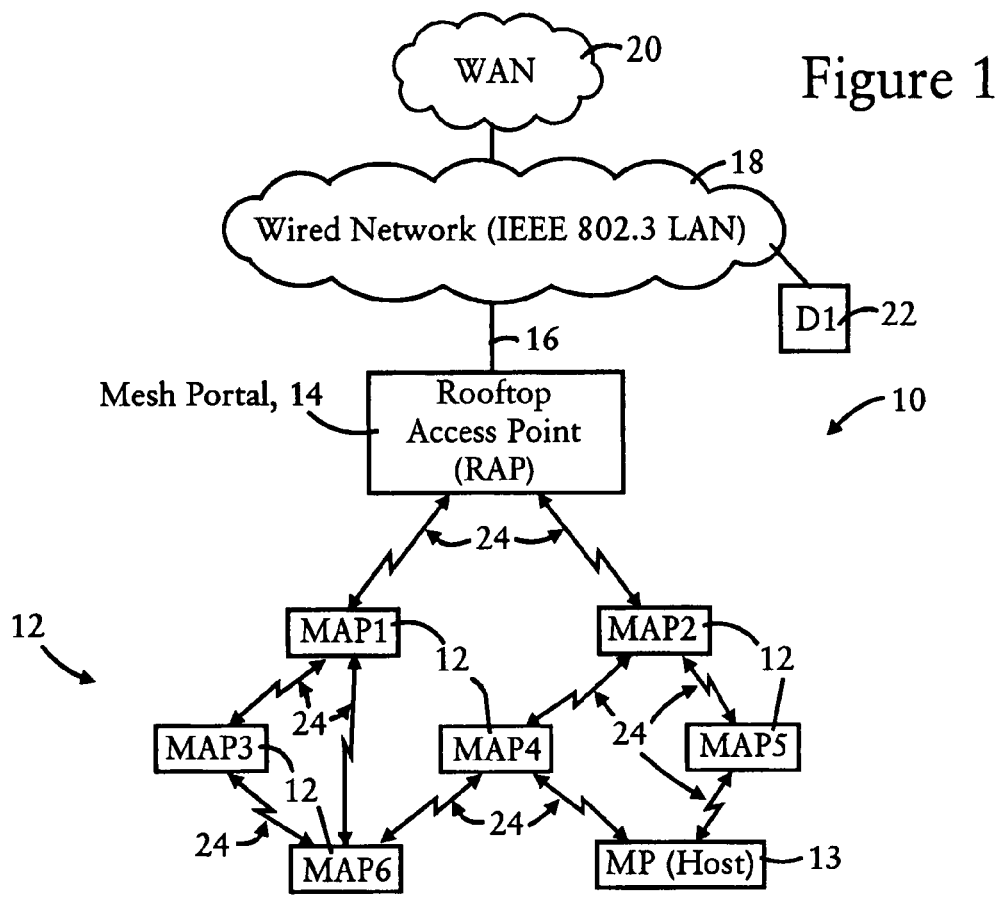
FIG. 1 illustrates an example system having mesh access points configured for retransmitting a lost packet with a subsequently received packet, according to an example embodiment.

In one embodiment, a method comprises transmitting onto a wireless connection, by a device, a first wireless data packet destined for a second device; in response to a determined absence by the device of a required acknowledgment of the first wireless data packet from the second device, queuing by the device the first wireless data packet while waiting for a second wireless data packet; receiving by the device the second wireless data packet; and transmitting, by the device, the first wireless data packet with the second wireless data packet to the second device via the wireless connection in response to the device receiving the second wireless data packet and before any other device can send a data frame on the wireless connection.

In another embodiment, an apparatus comprises a wireless interface circuit configured for transmitting onto a wireless connection a first wireless data packet destined for a second device; and a media access control circuit. The media access control circuit is configured for determining an absence of a required acknowledgment of the first wireless data packet from the second device. The media access control circuit further is configured for queuing the first wireless data packet in response to the determined absence of the required acknowledgment while waiting for a second wireless data packet. The media access control circuit further is configured for responding to the wireless interface circuit receiving the second wireless data packet by causing the wireless interface circuit to transmit the first wireless data packet with the second wireless data packet to the second device via the wireless connection and before any other device can send a data frame on the wireless connection.

DETAILED DESCRIPTION

Particular embodiments enable a wireless device, for example a wireless mesh access point (MAP) in a wireless mesh network, to improve the probability of successfully completing a retransmission of a wireless data packet. The improved probability of successfully completing retransmission is based on introducing a delay before retransmission, where the delay can increase the probability of termination of interference that may have caused the wireless data packet to have been "lost" (e.g., based on a determined absence of a required acknowledgment for the wireless data packet). For example, a temporary obstruction (e.g., a passing vehicle, an electrical transient, etc.) may temporarily create interference between the wireless mesh access point and its upstream next-hop node (e.g., an upstream mesh access point or a rooftop access point), preventing the exchange of messages between the wireless mesh access point and its upstream next-hop node on a wireless connection established on a given wireless network channel.

The "IEEE Wireless LAN Edition", published by the IEEE Press, is identified as a compilation based on IEEE Std. 802.11™-1999 (R2003) and its Amendments. The IEEE Wireless LAN Edition and IEEE 802.11e each specify that the failure to receive an acknowledgment (ACK) frame that was expected requires the wireless network node to initiate a backoff procedure. The backoff procedure described in the IEEE Wireless LAN Edition and IEEE 802.11e requires the network node to wait a randomly selected number of 50 microsecond slot times before attempting retransmission of the data frame, where the randomly selected number (j) can be randomly selected from the range including 0 up to a maximum number of slot times ($MAX_N$). The maximum number of slot times ($MAX_N$) that can be selected is described as based on the number (N) of access attempts plus a bias factor (e.g., b=2) (e.g., $MAX_N=2^{N+2}-1$); hence, first retransmission attempt (N=2) can be initiated after the first backoff interval (between zero (0) and fifteen (15) slot times), with subsequent attempts (N) increasing the range of slot times to 255 slot times (see, e.g., Section 9.2.4 of the IEEE Wireless LAN Edition). This random number of slot times, however, may be insufficient for the elimination of the interference, especially since the first retransmission attempt will occur within 750 microseconds.

Hence, particular embodiments eliminate the reliance on multiple retries by the wireless mesh access point that may be unsuccessful due to the continued presence of the interference. Further, the elimination of multiple retries enables other wireless network nodes to obtain access to the same wireless network medium without waiting for completion of any retry attempts.

The particular embodiments also delay retransmission until a second wireless data packet is received by the wireless device. In response to receiving the second wireless data packet, the wireless device can transmit the first wireless data packet together with the second wireless data packet. In particular, the first wireless data packet is transmitted with the second wireless data packet such that both the first wireless data packet and the second wireless data packet are transmitted on the wireless connection before any other device can send a data frame on the wireless connection. In one embodiment, the first wireless data packet can be transmitted with the second wireless data packet, and before any other device can send a data frame on the wireless connection, based on transmitting both wireless data packets within the same transmit opportunity (TXOP) interval in accordance with the IEEE 802.11e specification. In another embodiment, the first wireless data packet can be transmitted with the second wireless data packet based on encapsulating both the first wireless data packet and the second wireless data packet within a single transmit frame, and transmitting the single transmit frame (containing the first wireless data packet and the second wireless data packet) to the destination device via the wireless connection.

Hence, utilization of the wireless network medium can be optimized among multiple wireless devices utilizing a carrier sense multiple access with collision avoidance (CSMA/CA) mechanism, where a first wireless device can wait to receive another wireless data packet before retransmitting a lost packet, and therefore defer to other wireless network nodes capable of transmitting data via the shared wireless medium. Hence, the latency in packet transmission by other wireless devices is reduced, because the other wireless devices do not need to wait for successful retransmission by the first wireless device, improving throughput for wireless devices that transmit packets on a regular basis (e.g., voice traffic). Further, the delay provides a greater probability for termination of the interference encountered by the first wireless device; the delay also improves network utilization by the first wireless device, since the first wireless device can optimize efficiency by transmitting at least two packets together on the network medium.

Consequently, the reduced latency by other wireless devices, plus the improved efficiency in transmitting at least two packets together, optimizes wireless transmission of smaller-sized, latency-sensitive voice packets transmitted by a voice codec on a regular basis (e.g., approximately every 20 milliseconds (ms)). Efficiency is further improved for multiple concurrent wireless voice over IP telephone calls, since a wireless network node can receive voice packets from multiple sources, enabling the wireless network node to receive another packet every 7-8 ms, reducing the overall delay while providing improved efficiency in network utilization and while maintaining sufficient time for the termination of localized interference. Hence, throughput of voice packets in a wireless network is substantially improved.

FIG. 1 illustrates an example wireless mesh network 10 having multiple mesh access points (MAPs) 12 that can provide wireless connectivity for a host network node 13 (e.g., a wireless voice over IP telephone or a wireless laptop having voice over IP functionality), according to an example embodiment. The mesh access points 12 can establish multiple wireless connections 24 that enable the host network node 13 to reach a wired local area network 18 via a mesh portal 14. The mesh portal 14, also referred to as a "rooftop access point" (RAP), can be implemented as a wired mesh access point having a wired connection 16 to a wired local area network (e.g., an IEEE 802.3 LAN) 18, serving as a root for wireless mesh points 12 that do not have a wired connection. The mesh portal 14 also can provide a wired connection to a wide area network (WAN) 20 and/or a wired host device 22 via the LAN 18.

Each of the mesh points 12 (e.g., the host MP 13 and the MAPs 12) can communicate with the mesh portal 14 via wireless mesh links 24 established between the mesh points 12 and the mesh portal 14 on wireless channels, for example IEEE 802.b or IEEE 802.g channels. Each mesh access point (MAP) 12 can be implemented for example based on the commercially-available Cisco Aironet Series 1500 Mesh Access Point from Cisco Systems, San Jose, Calif., and applying the features described below. Although not illustrated in FIG. 1, each MAP 12 can be controlled by a mesh controller within the wired LAN 18 according to a prescribed lightweight access point protocol, for example a Lightweight Access Point Protocol (LWAPP), commercially available from Cisco Systems, Inc., San Jose, Calif., and described in the Internet Engineering Task Force (IETF) Internet Draft by Calhoun et al., entitled "Light Weight Access Point Protocol", available via the World Wide Web at the site address "ietf.org/internet-drafts/draft-ohara-capwap-lwapp-04.txt". Each mesh access point 12 also can be configured to comply with other wireless protocols; for example, each mesh access point 12 can be configured as a wireless "station" (STA) according to the IETF draft by Calhoun et al, entitled "CAPWAP [Control And Provisioning of Wireless Access Points] Protocol Specification", available via the World Wide Web at the site address "ietforg/internet-drafts/draft-ietf-capwap-protocol-specification-07.txt"

As described in further detail below with respect to FIGS. 3 and 4, if a wireless network device (e.g., "MAP4") 12 is unable to successfully transmit a wireless voice data packet (e.g., "P1" in FIG. 4) to an upstream destination network device (e.g., "MAP2") due to temporary interference (e.g., a passing vehicle), the wireless network device (e.g., "MAP4") 12 can queue the wireless voice data packet ("P1") that was not successfully transmitted and wait until another wireless data packet (e.g., "P4" of FIG. 4) is received, deferring to other wireless network devices (e.g., "MAP2", "MAP5", "MAP6", "MP") that may contend for access to the wireless network medium providing the wireless connections 24. Upon receiving another wireless data packet (e.g., via the same wireless media channel used to attempt transmission of the first data packet "P1" or another wireless media channel), the wireless network device (e.g., "MAP4") can transmit together the first wireless data packet (e.g., "P1") with the second wireless data packet (e.g., "P4") to the destination wireless device (e.g., "MAP2") in a manner that ensures the first and second wireless data packets (e.g., "P1" and "P4) are transmitted before any other wireless device can send a data frame on the wireless connection 24, optimizing utilization of the wireless connection 24 provided by the wireless media channel.

Figure 2:
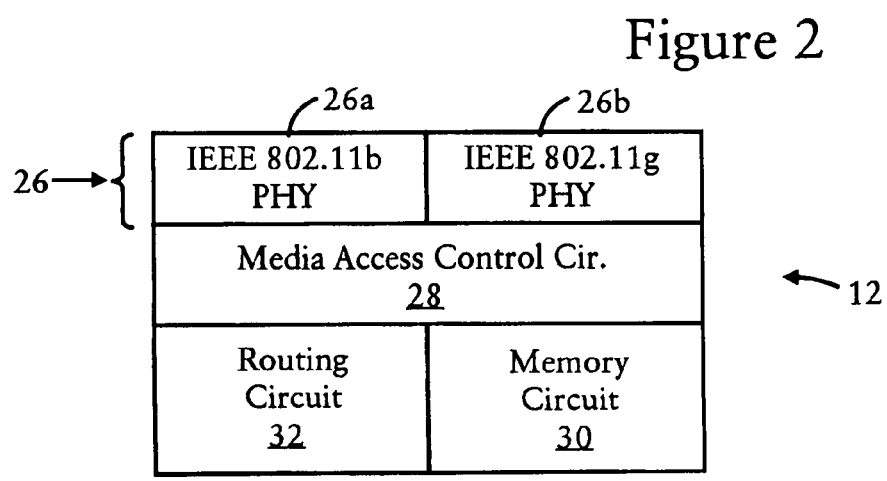
FIG. 2 illustrates an example mesh access point from the system of FIG. 1, according to an example embodiment.

FIG. 2 illustrates an example wireless device, for example a wireless mesh access point 12, according to an example embodiment. The wireless device 12 includes at least one wireless interface circuit 26, a media access control (MAC) circuit 28, a memory circuit 30, and a routing circuit 32. The routing circuit 32 can be configured for performing routing operations and other operations associated with the LWAPP protocol, including selecting a parent access point for reaching the mesh portal 14.

The wireless device 12 can include one or more wireless interface circuits 26, for example a first wireless interface circuit 26a that can be configured for transmitting and receiving wireless data packets onto wireless connections 24 using a first set of wireless media channels (e.g., IEEE 802.11b channels), and a second wireless interface circuit 26b that can be configured for sending and receiving wireless data packets onto wireless connections 24 using a second set of wireless media channels (e.g., IEEE 802.11g channels). The example wireless interface circuits 26 can be implemented using IEEE 802.11 Orthogonal Frequency-Division Multiplexed (OFDM) physical layer transceivers (PHY).

The media access control circuit 28 is configured for initiating transmission of wireless data packets according to a prescribed CSMA/CA protocol, for example the IEEE 802.11e protocol. Other relevant standards also can be implemented within the media access control circuit 28, for example IEEE 802.11s and/or the proposed IEEE P802.11s/D1.00.

The IEEE 802.11e specification specifies transmitting packets using a Carrier Sense Multiple Access with Collision Avoidance (CSMA/CA) mechanism. For example, a first station that has a packet to transmit determines if the wireless transmission medium is in use, i.e., if any data is currently being transmitted on the wireless transmission medium. If the medium is in use by a second station, the first station defers its transmission until detecting that the wireless medium is quiescent (i.e., is not currently transmitting any data; inactive) for at least a prescribed time interval. The first station can begin transmitting its data packet on the wireless transmission medium only after the medium has been quiescent for at least the prescribed time interval. The "prescribed time interval" for waiting to transmit after the wireless medium became quiescent can vary: IEEE Wireless LAN Edition and the IEEE 802.11e specification describe different interframe space (IFS) parameters to provide priority levels for access to the wireless medium, namely the short interframe space (SIFS), the PCF interframe space (PIFS), the Distributed Coordinated Function (DCF) interframe space (DIFS), the arbitration interframe space (AIFS) (specified in the IEEE 802.11e specification), and the extended interframe space (EIFS). The IEEE 802.11e specification describes the SIFS as having the minimum interframe space relative to the PIFS, DIFS, AIFS, and EIFS.

The IEEE 802.11e specification also describes an enhanced distributed channel access (ED CA) that delivers traffic based on differentiating user priorities (UPs), where differentiation is achieved by varying various parameters for different UP values, including the amount of time that a wireless network node must wait for the wireless channel to be idle before the wireless network node can attempt transmission or initiate "backoff" procedures with other wireless network nodes contending for access to the wireless channel.

As described in Section 7 of the IEEE Wireless LAN Edition, various types of frames may be transmitted on a wireless medium, including control frames (described in Sec. 7.2.1), data frames (described in Sec. 7.2.2), and management frames (described in Sec. 7.2.3). The IEEE Wireless LAN Edition also specifies that an example control frame is an acknowledgment (ACK) frame. The IEEE Wireless LAN Edition also describes (e.g., at Sec. 9.2.3.1) that the short interframe space (SIFS) interval can be used only in limited circumstances (e.g., sending an ACK frame, sending a Clear to Send (CTS) frame in response to a Request to Send (RTS) frame). The IEEE Wireless LAN Edition also describes (e.g., at Sec. 9.2.3.3) that the DIFS interval must be used by devices operating under the Distributed Coordination Function (DCF) to transmit data frames (also referred to as MAC Protocol Data Units (MPDUs)) and management frames (also referred to as MAC Management Protocol Data Units (MMPDUs)).

According to the example embodiment, the media access control circuit 28 can be configured for utilizing the different IFS parameters and the "backoff" procedures in order to initiate transmission of a new data packet, in compliance with IEEE 802.11e. In the case of a "lost" packet, however, where the media access control circuit 28 determines an absence of a required acknowledgment of the transmitted data packet, the media access control circuit 28 can be configured for queuing the "lost" data packet into the memory circuit 30, until reception of another wireless data packet that enables the media access control circuit 28 to transmit both the first wireless data packet together with the second wireless data packet to the destination parent access point (e.g., "MAP2") before any other device can send a data frame on the wireless connection.

The term "data packet" as used herein can refer to any type of Layer 2 Protocol Data Unit (PDU) according to the OSI Reference Model. Hence, the term "data packet" can refer to any layer2 "frame" (e.g., a control frame, a data frame, or a management frame). Hence, the term "data packet" as used herein is not limited to a Layer 3 PDU according to the OSI Reference Model. In contrast, the term "data frame" as used herein is to be consistent with the usage in the OSI Reference Model and Section 7 of the IEEE Wireless LAN Edition as a Layer 2/MAC Protocol Data Unit (MPDU) that carries "data" type information, as opposed to a "control frame" that carries "control" type information or a "management frame" that carries "management" type information.

Any of the disclosed circuits of the wireless device 12 (including the wireless interface circuit 26, the media access control circuit 28, the memory circuit 30, the routing circuit 32, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 30) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 30 can be implemented, for example, using a non-volatile memory such as a programmable read only memory (PROM) or an EPROM, and/or a volatile memory such as a DRAM, etc. The memory circuit 30 also can be implemented to include transmit and/or receive queues (e.g., FIFO buffers or circular buffers) used by the media access control circuit 28 for storing wireless data packets that are to be transmitted, or for storing wireless data packets as they are received from a wireless connection provided by a wireless network channel.

Further, any reference to "outputting a message", "outputting a frame" (e.g., data frame, control frame such as an acknowledgment frame, etc.) or "outputting a packet" can be implemented based on creating the message/packet in the form of a data structure and storing that data structure in a tangible memory medium in the disclosed apparatus (e.g., in a transmit buffer in the memory circuit 30). Any reference to "outputting a message", "outputting a frame", or "outputting a packet" also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message", "receiving a frame", or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer in the memory circuit 30). Also note that the memory circuit 30 can be implemented dynamically by the routing circuit 32 and/or the media access control circuit 28, for example based on memory address assignment and partitioning executed by the routing circuit 32 or the media access control circuit 28.

Figure 3:
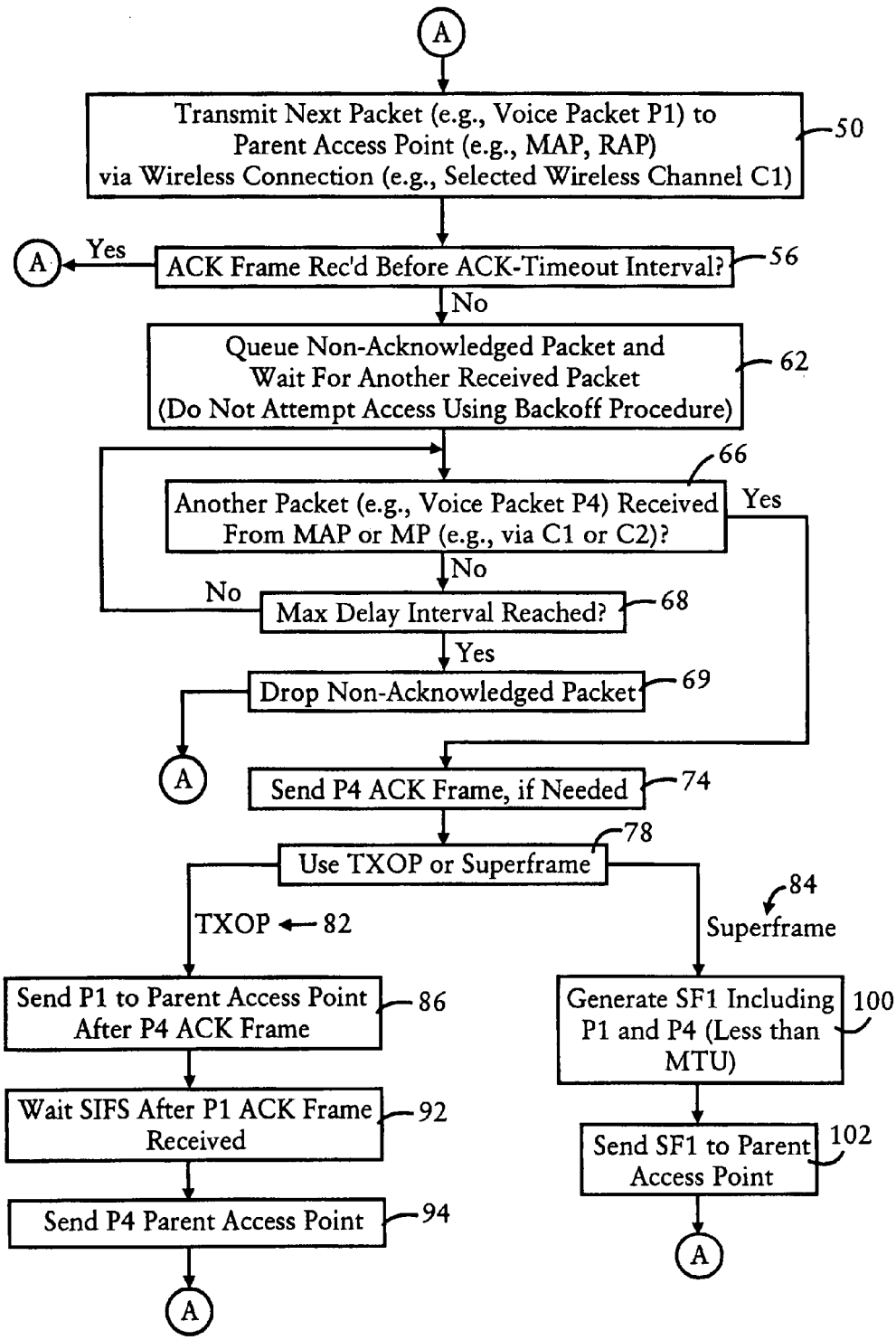
FIG. 3 illustrates an example method by the mesh access point of FIG. 2, according to an example embodiment.

FIG. 3 illustrates an example method by the wireless device (e.g., "MAP4") 12 of FIGS. 1 and 2, according to an example embodiment. The steps described in FIG. 3 can be implemented as executable code stored on a computer readable medium (e.g., floppy disk, hard disk, ROM, EEPROM, non-volatile RAM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

Figure 4:
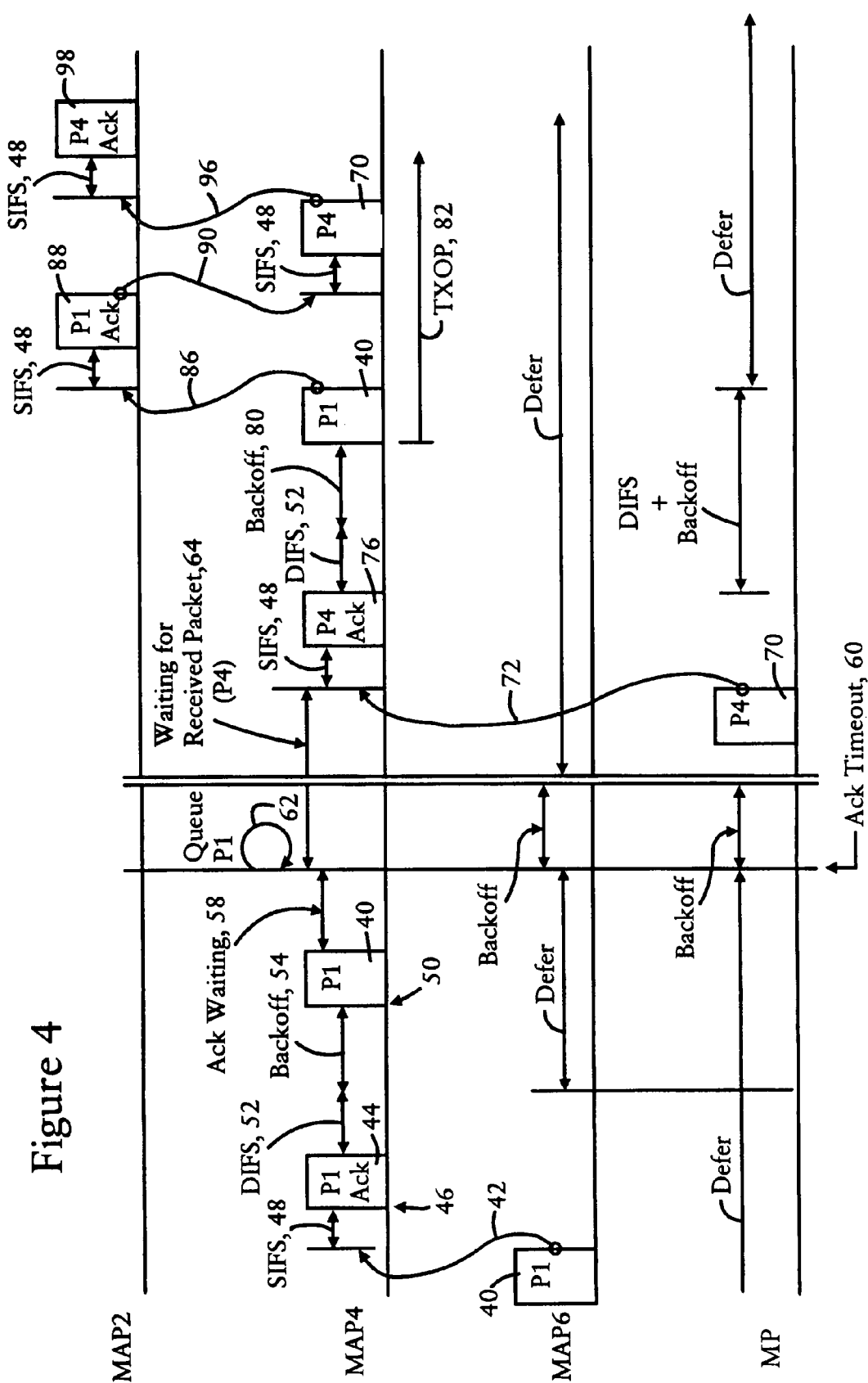
FIG. 4 is a timing diagram illustrating the example method of FIG. 3 according to an example embodiment.

FIG. 4 is a timing diagram illustrating execution of the steps of FIG. 3 by the wireless device (e.g., "MAP4") 12 of FIGS. 1 and 2. As illustrated in FIG. 4, the wireless interface circuit 26 of the wireless device "MAP4" 12 can receive a wireless data packet ("P1") 40, for example a wireless voice over IP packet (e.g., a wireless data frame), at event 42 from one of the other wireless network nodes, for example the wireless mesh access point "MAP6" 12. The media access control circuit 28 of the wireless device "MAP4" 12 can respond to reception of the wireless data packet ("P1") 40 by generating and outputting for transmission by the wireless interface circuit 26 an acknowledgment message ("P1 Ack") 44 at event 46, following a prescribed SIFS interval 48, in accordance with the IEEE 802.11e specification.

In response to receiving the first wireless data packet ("P1") (e.g., wireless data frame) 40, the media access controller circuit 28 can cause the wireless interface circuit 26 to initiate transmission of the first wireless data packet ("P1") 40 to the destination parent access point "MAP2" via an upstream wireless connection 24 at event 50 of FIGS. 3 and 4. The media access controller circuit 28 initiates transmission at event 50 after the prescribed DIFS 52 and a prescribed backoff interval 54 chosen by the media access control circuit 28. The upstream wireless connection 24 can be provided via the same wireless channel (e.g., C1) used to transmit the wireless data packet 40 from the mesh access point "MAP6" to the mesh access point "MAP4", or via another available wireless channel.

Following transmission of the first wireless data packet ("P1") 40, the media access controller circuit 28 determines in step 56 of FIG. 3 whether an acknowledgment (ACK) frame has been received from the parent access point "MAP2" within a prescribed acknowledgment waiting interval 58. If in step 56 the media access control circuit 28 determines at event 60 an absence of a required acknowledgment frame for the transmitted wireless data packet ("P1") 40 from the destination parent access point "MAP2" within the required time interval 58 (i.e., that no acknowledgment frame is received from the parent access point "MAP2"), the media access control circuit 28 queues in step 62 the non-acknowledged ("lost") wireless data packet ("P1") 40 into the memory circuit 30, and initiates a wait state 64, illustrated in FIG. 4.

As illustrated in FIG. 3, the media access control circuit 28 of the mesh access point "MAP4" 12 can implement the wait state 64 by determining in step 66 whether another wireless data packet is received by the wireless interface circuit 26, for example on the same wireless channel (e.g., "C1") used to transmit the non-acknowledged wireless data packet ("P1"), or on another wireless channel (e.g., "C2") that can be used by either the same wireless interface circuit (e.g., 26b) or another wireless interface circuit (e.g., 26a). If in step 66 the media access control circuit 28 does not detect another received packet (e.g., another wireless data frame), and if in step 68 a maximum delay interval (e.g., 20 ms) has not been reached, the media access control circuit 28 maintains its wait state 64. Hence, other wireless network nodes (e.g., "MAP6", "MP", etc.) can utilize the wireless network medium to transmit data frames, management frames, control frames, etc., while the media access control circuit 28 of the mesh access point "MAP4" 12 maintains its wait state 64. If the maximum delay interval is reached at step 68, the media access control circuit 28 can drop the non-acknowledged packet ("P1") 40 in step 69.

Assuming the maximum delay interval is not reached in step 68, the media access control circuit 28 can detect in step 66 the reception of a second wireless data packet ("P4") (e.g., a second wireless data frame) 70 by the wireless interface circuit 26 from the host mesh point (MP) 13 at event 72, illustrated in FIG. 4. The second wireless data packet ("P4") 70 can be another voice packet for another wireless voice over IP conversation.

In response to the wireless interface circuit 26 of the mesh access point "MAP4" 12 receiving the second wireless data packet ("P4") 70, the media access control circuit 28 can cease the wait state 64 by generating and outputting in step 74 (for transmission by the wireless interface circuit 26) an acknowledgment frame ("P4 Ack") 76 following the required SIFS interval 48, if required. In response to reception of the second wireless data packet ("P4") 70, the media access control circuit 28 also ceases the wait state 64 by outputting in step 78 (for transmission by the wireless interface circuit 26) the first wireless data packet ("P1") 40 together with the second wireless data packet ("P4") 70 to the destination parent access point "MAP2", following the required DIFS interval 52 and the backoff interval 80. As described below, the first wireless data packet ("P1") 40 can be transmitted together with the second wireless data packet ("P4") 70 either by transmitting both within a single transmit opportunity (TXOP) interval 82 before any other wireless device 12 can send a data frame on the wireless connection 24, or based on encapsulating both the first wireless data packet ("P1") 40 and the second wireless data packet ("P4") 70 within a new packet (a "superframe") 84.

For example, a single transmit opportunity (TXOP) interval 82 can be utilized in accordance with IEEE 802.11e, enabling multiple data frames that are pending transmission to be transmitted with a single TXOP interval, based on utilizing a SIFS interval 48. As illustrated in FIGS. 3 and 4, the media access control circuit 28 can cause the wireless interface circuit 26 to transmit in step 86 the first wireless data packet ("P1") 40 to the parent access point "MAP2" via the upstream wireless connection 24 provided by the wireless media channel. The parent access point "MAP2" can acknowledge reception of the wireless data packet ("P1") 40 by transmitting the acknowledgment frame ("P1 Ack") 88 following the required SIFS interval 48.

In response to the media access control circuit 28 of the mesh access point "MAP4" 12 receiving at event 90 the acknowledgment frame 88, the media access control circuit 28 can transmit in step 94 of FIG. 3 the second wireless data packet ("P4") (e.g., wireless data frame) 70 following waiting in step 92 the SIFS interval 48 within the transmit opportunity interval 82. Hence, the media access control circuit 28 need not wait for the DIFS interval 50 or a backoff interval before transmitting the second wireless data packet ("P4") 70 because the media access control circuit 28 is within the TXOP interval 82. In response to the parent mesh access point "MAP2" receiving the second wireless data packet ("P4") 70 at event 96, the parent mesh access point "MAP2" can output the corresponding acknowledgment frame ("P4 Ack") 98 to the mesh access point "MAP4" 12 after waiting the SIFS interval 48.

Hence, the mesh access point "MAP 4" can send the data packets (e.g., data frames) "P1" 40 and "P4" 70 within the single TXOP interval 82 using the SIFS interval 48, and the mesh access point "MAP2" can respond with the respective acknowledgment frames "P1 Ack" 88 and "P4 Ack" 98 using the SIFS intervals 88. In contrast, all other wireless devices (e.g., MAP 6, MP13, etc.) having data frames to send must wait the longer DIFS interval 52, and therefore must defer to the mesh access points "MAP4" and "MAP2"; hence, the data packet (e.g., data frame) "P1" 40 can be transmitted together with the data packet (e.g., data frame) "P4" 70 within the single TXOP interval 82 using the SIFS interval 48, before any other device can send a data frame on the wireless connection 24.

Another example embodiment for transmitting both the first wireless data packet ("P1") 40 with the second wireless data packet ("P4") 70 involves generating in step 100 of FIG. 3 a "superframe" ("SF 1") 84 that includes both the first wireless data packet ("P1") 40 and the second wireless data packet ("P4") 70. As described above, both the first wireless data packet ("P1") 40 and the second wireless data packet ("P4") 70 can be voice data packets: since voice data packets tend to have a relatively small size, the superframe 84 containing both the voice data packets 40 and 70 still will be smaller than the maximum transfer unit (MTU) specified under IEEE 802.11. Hence, the media access control circuit 28 can cause the wireless interface circuit 26 to output in step 102 the superframe to the parent access point "MAP2", enabling both wireless data packets 40 and 70 to be transmitted together before any other device can send a data frame on the wireless connection.

Since the parent access point "MAP2" receives in this example of step 102 only a single superframe, as opposed to receiving two distinct wireless data packets, the parent access point "MAP2" need only send a single acknowledgment in response to receiving the superframe 84. In a similar manner, the first wireless data packet ("P1") 40 and/or the second wireless data packet ("P4") 70 also could be a superframe containing multiple voice packets: as apparent from the foregoing, the media access control circuit 28 needs to send only a single corresponding acknowledgment (e.g., 44, 76) in response to the received wireless data packet. Hence, use of superframes further improves bandwidth utilization by reducing the number of acknowledgments that are needed. Once the data packets are received by the rooftop access point (RAP) 14 of FIG. 1, the RAP 14 can parse all of the received packets and recover individual voice packets from any of the transmitted superframes.

According to the example embodiments, network utilization by a wireless network node is improved by delaying retry attempts of a first data packet until the wireless network node has received a second data packet for transmission, at which point the first data packet is transmitted together with the second data packet to optimize utilization of the wireless media channel during access thereof by the wireless network node.

Although the example embodiments illustrated a mesh access point that relays received wireless data packets, the example embodiments can be implemented within any wireless network node that relays received wireless data packets.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   transmitting onto a wireless connection, by a device, a first wireless data packet destined for a second device;
   in response to a determined absence by the device of a required acknowledgment of the first wireless data packet from the second device, queuing by the device the first wireless data packet while waiting for a second wireless data packet;
   receiving by the device the second wireless data packet; and
   transmitting, by the device, the first wireless data packet with the second wireless data packet to the second device via the wireless connection in response to the device receiving the second wireless data packet and before any other device can send a data frame on the wireless connection.

2. The method of claim 1, wherein the first wireless data packet is transmitted with the second wireless data packet within a single transmit opportunity interval according to a prescribed wireless medium access protocol.

3. The method of claim 2, wherein the first wireless data packet and the second wireless data packet are voice packets carrying voice data.

4. The method of claim 2, wherein the device is a mesh access point and the wireless connection is an upstream connection toward a wired access point having a wired connection to a wired network, the receiving including receiving the second wireless data packet, via a second wireless connection, from one of a second mesh access point or a host network node.

5. The method of claim 1, wherein the transmitting of the first wireless data packet with the second wireless data packet includes:

creating a single transmit data frame that includes the first wireless data packet and the second wireless data packet, and transmitting the single transmit data frame containing the first wireless data packet and the second wireless data packet to the second device via the wireless connection.

6. The method of claim 5, wherein the single transmit data frame is less than a prescribed maximum transfer unit.

7. The method of claim 5, wherein the first wireless data packet and the second wireless data packet each are voice packets carrying voice data.

8. The method of claim 5, wherein the device is a mesh access point and the wireless connection is an upstream connection toward a wired access point having a wired connection to a wired network, the receiving including receiving the second wireless data packet, via second wireless connection, from one of a second mesh access point or a host network node.

9. The method of claim 5, wherein the first wireless data packet contains voice data and the second wireless data packet contains first and second voice packets containing voice data, the method further comprising outputting, by the first device to a third device having transmitted the second wireless data packet, a single acknowledgment in response to the first device receiving the second wireless data packet.

10. An apparatus comprising:
a wireless interface circuit configured for transmitting onto a wireless connection a first wireless data packet destined for a second device; and
a media access control circuit configured for determining an absence of a required acknowledgment of the first wireless data packet from the second device, the media access control circuit further configured for queuing the first wireless data packet in response to the determined absence of the required acknowledgment while waiting for a second wireless data packet, wherein the media access control circuit further is configured for responding to the wireless interface circuit receiving the second wireless data packet by causing the wireless interface circuit to transmit the first wireless data packet with the second wireless data packet to the second device via the wireless connection and before any other device can send a data frame on the wireless connection.

11. The apparatus of claim 10, wherein the media access control circuit is configured for causing the first wireless data packet to be transmitted with the second wireless data packet within a single transmit opportunity interval according to a prescribed wireless medium access protocol.

12. The apparatus of claim 11, wherein the first wireless data packet and the second wireless data packet are voice packets carrying voice data.

13. The apparatus of claim 11, wherein the media access control circuit is configured to operate as a mesh access point and the wireless connection is an upstream connection toward a wired access point having a wired connection to a wired network, the wireless interface circuit configured for receiving the second wireless data packet, via a second wireless connection, from one of a second mesh access point or a host network node.

14. The apparatus of claim 10, wherein the media access control circuit is configured for causing the first wireless data packet to be transmitted with the second wireless data packet based on:
creating a single transmit data frame that includes the first wireless data packet and the second wireless data packet, and
sending the single transmit data frame containing the first wireless data packet and the second wireless data packet to the wireless interface circuit for transmission to the second device via the wireless connection.

15. The apparatus of claim 14, wherein the single transmit data frame is less than a prescribed maximum transfer unit.

16. The apparatus of claim 14, wherein the first wireless data packet and the second wireless data packet each are voice packets carrying voice data.

17. The apparatus of claim 14, wherein the media access control circuit is configured to operate as a mesh access point and the wireless connection is an upstream connection toward a wired access point having a wired connection to a wired network, the wireless interface circuit configured for receiving the second wireless data packet, via a second wireless connection, from one of a second mesh access point or a host network node.

18. The apparatus of claim 14, wherein the first wireless data packet contains voice data and the second wireless data packet contains first and second voice packets containing voice data, the media access control circuit configured for generating, for output by the wireless interface circuit to a third device having transmitted the second wireless data packet, a single acknowledgment in response to the wireless interface circuit receiving the second wireless data packet.

19. An apparatus comprising:
a transmitter for transmitting onto a wireless connection a first wireless data packet destined for a second device; and
means for determining an absence of a required acknowledgment of the first wireless data packet from the second device, the means for determining further configured for queuing the first wireless data packet in response to the determined absence of the required acknowledgment while waiting for a second wireless data packet, wherein the means for determining further is configured for responding to the means for transmitting receiving the second wireless data packet by causing the means for transmitting to transmit the first wireless data packet with the second wireless data packet to the second device via the wireless connection.

* * * * *